United States Patent [19]
Messmer

[11] 3,894,423
[45] July 15, 1975

[54] AIR GAGE CARTRIDGE

[75] Inventor: Robert C. Messmer, King of Prussia, Pa.

[73] Assignee: J. M. Schmidt Precision Tool Co., Inc., West Chester, Pa.

[22] Filed: Oct. 15, 1973

[21] Appl. No.: 406,150

[52] U.S. Cl. .................................. 73/37.5
[51] Int. Cl. ........................................ G01b 13/00
[58] Field of Search .................. 73/37.5, 37.6, 37.8; 33/DIG. 2

[56] References Cited
UNITED STATES PATENTS

| | | | |
|---|---|---|---|
| 2,993,364 | 7/1961 | Kirk | 73/37.5 |
| 3,150,442 | 9/1964 | Straw et al. | 73/37.5 X |
| 3,371,517 | 3/1968 | Roth | 73/37.5 |

*Primary Examiner*—Jerry W. Myracle
*Assistant Examiner*—Joseph W. Roskos
*Attorney, Agent, or Firm*—Smith, Harding, Earley & Follmer

[57] ABSTRACT

An air gage cartridge in which a nozzle providing member having a nozzle opening at one end is positioned within an outer sleeve member which is made of hardened material and extends beyond the nozzle opening end of the nozzle member to provide a wear surface. The cartridge can be simply and economically installed within the supporting fixture which holds the cartridge in the gaging position.

11 Claims, 4 Drawing Figures

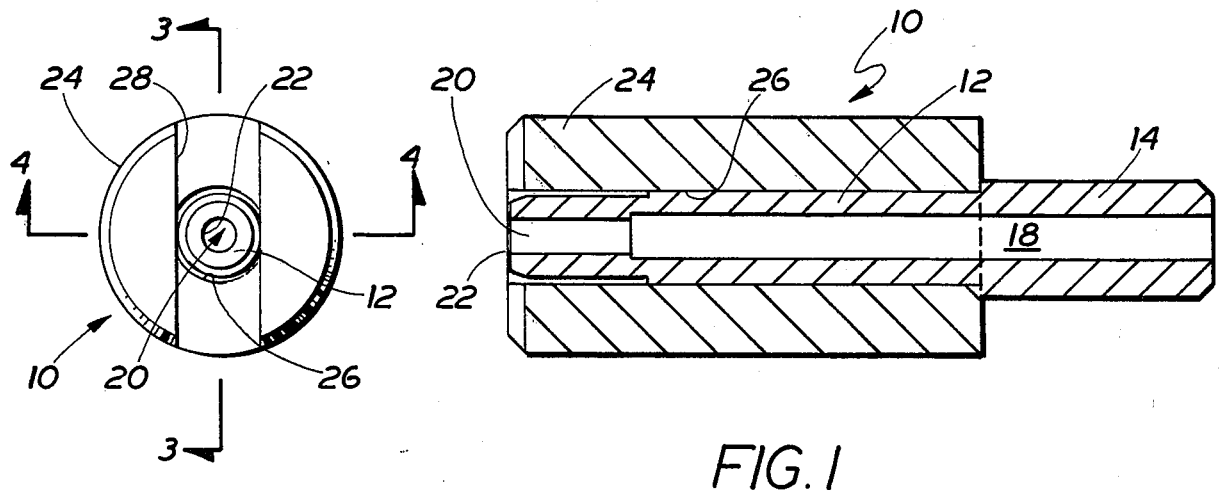
FIG. 2
FIG. 1
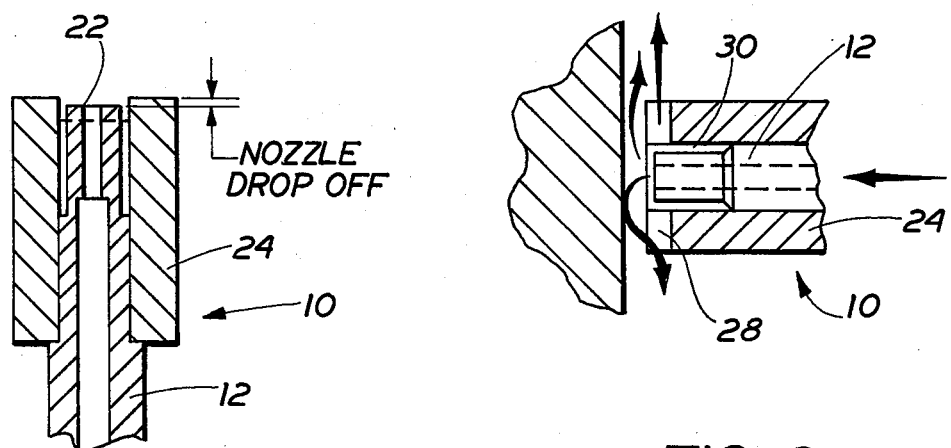
FIG. 4
FIG. 3

AIR GAGE CARTRIDGE

BACKGROUND OF THE INVENTION

This invention relates generally to air gage cartridges and more particularly to open nozzle type cartridges which are mounted with protective wear surfaces.

The cartridges of the indicated type are used with conventional air gages which typically comprise a regulated compressed air supply, a flow or pressure measuring instrument, and an air gage cartridge or head which includes a restricted gaging nozzle. The elements of the air gage system are arranged so that the regulated flow of compressed air is delivered past the measuring instrument to the gaging nozzle. In measuring the dimensions of a workpiece, the workpiece is positioned adjacent the nozzle which is supported in a fixture of some type, the arrangement being such that the workpiece restricts the flow of air from the nozzle. This flow of air out of the gaging nozzle is dependent upon the clearance between the workpiece and the gaging nozzle. Variations of this clearance causes a corresponding variation in the flow through the nozzle and the back pressure in the system either of which is measured by means of a suitable flow meter or pressure gage to provide an indication of the dimension of the workpiece.

In the use of many types of air gages employing open nozzles there must be provided wear surfaces extending beyond the nozzle opening to maintain the proper minimum relationship between the workpiece and the gaging nozzle. This is commonly known in the art as "nozzle drop off" and will be so referred to hereinafter. The wear surfaces also provide protection against mechanical damage to the nozzles and aid in nesting the workpiece in the gage fixture. The provision of these wear surfaces in the past has involved expensive and complicated installations.

Typically the prior art construction involves the provision of hardened or carbide plates fitted in the wall of the gage supporting fitting which faces the workpiece during a gaging operation. After the plates are fitted in position they are ground to accommodate the maximum workpiece diameter plus a few thousandths for clearance purposes. The gage cartridges must then be positioned in the supporting fitting and carefully adjusted relative to the wear surfaces to give the proper nozzle drop off. This is an expensive and complicated procedure.

The situation becomes even more complicated when it is necessary to provide a plurality of gages for measuring a workpiece at a plurality of locations, since the gage cartridges must be aligned with each other as well as with the workpiece.

It is noted that the nozzles themselves are not made of a hardened tool steel because the internal surfaces thereof come in contact with the air supply which may contain water. This would cause the formation of rust and destroy the accuracy of the gage system.

SUMMARY OF THE INVENTION

It is the general object of the invention to provide an air gage cartridge which includes its own wear surface so that it can be positioned in the gaging position within the supporting fixture accurately and economically.

Briefly stated, the general object of the invention is achieved by constructing the cartridge with a nozzle providing member which is positioned within an outer sleeve member, the latter being made of a hardened material and extending beyond the end of the nozzle member to provide a wear surface and to define the nozzle drop off. By this arrangement, the cartridge contains its own wear surface and can be more easily and economically installed in a supporting fixture in the gaging position. Moreover, a constant nozzle drop off is provided during the manufacture of the cartridge and will not have to be determined by adjustment in the field during installation.

BRIEF DESCRIPTION OF THE DRAWING

FIG. 1 is an enlarged sectional view of an air gage cartridge in accordance with the invention;

FIG. 2 is an end view of the cartridge shown in FIG. 1;

FIG. 3 is an enlarged fragmentary sectional view taken generally on line 3—3 of FIG. 2 and illustrating in exaggerated form a detail of the cartridge shown in FIG. 1; and FIG. 4 is an enlarged fragmentary sectional view taken generally on line 4—4 of FIG. 2 and illustrating in exaggerated form a detail of the cartridge shown in FIG. 1.

DESCRIPTION OF THE PREFERRED EMBODIMENT

An air gage cartridge in accordance with the invention is indicated generally at 10 and comprises a cylindrical nozzle member 12 having a barb portion 14 provided at one end. The barb portion 14 is adapted to have connected thereon a hose through which compressed air is supplied to an internal passage 18 within the nozzle member 12. Passageway 18 communicates with a restricted nozzle passage 20 which defines a nozzle opening 22 at the end of the nozzle member 12.

Nozzle member 12 is fixedly mounted within a hollow cylindrical sleeve member 24 provided with an internal cylindrical bore 26. The nozzle member 12 fits into the cylindrical bore 26 by a pressed fit, the hollow form of the sleeve member 24 making the pressed fit easy to achieve. The parts are constructed and arranged so that in the secured position of the nozzle member 12 within the sleeve member 24, the end of the sleeve member 24 extends beyond the end of the nozzle member 12 to provide the desired nozzle drop off as illustrated in FIG. 4 wherein the parts are shown in exaggerated form. A typical nozzle drop off would be from about two to six ten thousandths of an inch which is shown in exaggerated form in FIG. 4 for purposes of illustration.

The sleeve member is preferably made of one of a high alloy tool steel hardened to about 67–70 on the Rockwell C scale. The nozzle member 12 is preferably made of stainless steel hardened to about 56–58 on the Rockwell C scale to provide a rust-free member as hard as the cartridges generally in use today. Accordingly, the sleeve member 24, which is harder by about ten points on the Rockwell C scale, serves to maintain the constant nozzle drop off which is provided during manufacture and does not have to be set in the field.

The end of the sleeve member 24 is provided with a diametrically extending slot 28 which serves as an air escape passage. The width of the slot is approximately the same as the external diameter of the nozzle member 12 and its depth would typically be about ten thousandths of an inch which is substantially greater than the nozzle drop off.

In the region of the nozzle member 12 surrounding the nozzle passage 20, the external diameter of the nozzle member is reduced to be less than the internal diameter of the internal bore in the sleeve member 24. Accordingly, there is provided an annular chamber or passageway 30 in this region as is shown in FIG. 3 where the dimensions are exaggerated to illustrate the air escape flow by the arrows therein.

The provision of the annular passageway 30 has two advantages. First, the passageway 30 serves to prevent nozzle distortion during assembly when the nozzle member 12 is forced into the bore 26 to provide a secure press fit. The dimensions of the nozzle opening 22 and of the nozzle member 12 are critical as regards the accuracy of the gage. Secondly, the annular passage 30 provides an air escape passage through which air can flow if necessary. For example, if the workpiece were positioned very close to the nozzle opening 22, the air could escape from the nozzle opening by way of the annular passage 30 and the air escape passage provided by slot 28.

In assembling the cartridge 10 in a gaging position, the cartridge 10 is simply positioned in a cylindrical bore in the supporting member and adjusted axially for size by placing a shim between the end of the cartridge 10 and the maximum size workpiece whereat the cartridge 10 is secured in the gaging position by suitable means. Since the cartridge 10 carries its own wear surface, all the complications of the prior art installing procedures is obviated.

It will be apparent that various changes may be made in the construction and arrangement parts without departing from the scope of the invention. For example, the cartridge may be square or some other form instead of cylindrical and may be cemented together instead of being pressed together. Also, the sleeve may be made of carbide or other suitable wear resistant materials.

I claim:

1. An air gage cartridge adapted to be mounted in a gaging fixture comprising a nozzle member defining a nozzle opening at one end thereof and having an air supply passage formed therein for delivering air to said nozzle opening, and a tubular sleeve member having an internal bore, said nozzle member being fixedly mounted within said bore of said sleeve member in a position wherein said sleeve member has a portion projecting beyond said nozzle opening to provide a predetermined nozzle drop off, said projecting portion of said sleeve being made of a material having high wear resistance properties substantially greater than the wear resistance properties of the nozzle member, said wear resistance properties of said projecting portion of said sleeve member being sufficient to provide a wear surface for said cartridge.

2. An air gage cartridge according to claim 1 wherein said nozzle member being securely fitted within said sleeve member bore and having a reduced diameter portion in the region extending axially inwardly from said nozzle opening.

3. An air gage cartridge according to claim 2 wherein said projecting portions providing said wear surface define a slot therebetween providing air escape passages extending radially outwardly from said nozzle opening.

4. An air gage cartridge according to claim 3 wherein said nozzle member is made of a rust proof material.

5. An air gage cartridge according to claim 4 wherein said entire sleeve member is made of the same high wear resistant material.

6. An air gage cartridge according to claim 5 wherein said reduced diameter portion of said nozzle member cooperates with said bore of said sleeve member to define an annular chamber communicating with said slot to provide an air escape passageway.

7. An air gage cartridge according to claim 3 wherein said reduced diameter portion of said nozzle member cooperates with said bore of said sleeve member to define an annular chamber communicating with said slot to provide an air escape passageway.

8. An air gage cartridge according to claim 7 wherein said nozzle member is made of a rust proof material.

9. An air gage cartridge according to claim 1 wherein said nozzle member is made of a rust proof material and is provided with a portion beyond said sleeve bore adapted to be engaged with an air supply conduit so as to isolate said air supply passage from said nozzle member.

10. An air gage cartridge according to claim 9 wherein said nozzle member is hardened to about 56–58 on the Rockwell C scale and said sleeve member being hardened to about 67–70 on the Rockwell C scale.

11. An air gage cartridge according to claim 9 wherein said sleeve member is made of carbide and said nozzle member is made of stainless steel.

* * * * *